US005357743A

United States Patent [19]

Zarzalis et al.

[11] Patent Number: 5,357,743

[45] Date of Patent: Oct. 25, 1994

[54] BURNER FOR GAS TURBINE ENGINES

[75] Inventors: Nikolaos Zarzalis, Dachau; Franz Joos, Müchen, both of Fed. Rep. of Germany

[73] Assignee: MTU Motoren-Und Turbinen-Union Muenchen GmbH, Fed. Rep. of Germany

[21] Appl. No.: 111,481

[22] Filed: Aug. 25, 1993

[30] Foreign Application Priority Data

Aug. 29, 1992 [DE] Fed. Rep. of Germany ....... 4228817

[51] Int. Cl.$^5$ ....... F02C 9/20

[52] U.S. Cl. ....... 60/39.23; 60/39.29; 60/748

[58] Field of Search ....... 60/737, 740, 748, 39.23, 60/39.29

[56] References Cited

U.S. PATENT DOCUMENTS

| | | | |
|---|---|---|---|
| 2,655,787 | 10/1953 | Brown | 60/39.23 |
| 3,893,296 | 7/1975 | Fredriksen | 60/737 |
| 4,044,553 | 8/1977 | Vaught | 60/39.23 |
| 4,542,622 | 9/1985 | Greene et al. | 60/39.23 |
| 4,726,182 | 2/1988 | Barbier et al. | 60/39.23 |
| 4,754,600 | 7/1988 | Barbier et al. | 60/748 |
| 5,197,290 | 3/1993 | Lee et al. | 60/39.29 |

FOREIGN PATENT DOCUMENTS

| | | |
|---|---|---|
| 0251895 | 1/1983 | European Pat. Off. . |
| 2442895 | 7/1986 | Fed. Rep. of Germany . |

*Primary Examiner*—Richard E. Gluck
*Assistant Examiner*—William J. Wicker
*Attorney, Agent, or Firm*—Evenson, McKeown, Edwards & Lenahan

[57] ABSTRACT

A burner for gas turbine engines is provided in which a ring-shaped swirling device is coaxially assigned to a fuel nozzle. The swirling device forms tangential ducts for an adjustable feeding of combustion air between profiled surfaces arranged along the circumference. Two components, which are axially adjustable relative to one another, are to form, on mutually opposite faces, the ducts between profiles and recesses which are arranged offset relative to one another along the circumference, in such a manner that, when at least one component is adjusted, the profiles can be moved into the recesses for a reduction of the duct cross-sections or can be moved out of the recesses for an enlargement of the duct cross-sections.

20 Claims, 8 Drawing Sheets

BURNER FOR GAS TURBINE ENGINES

BACKGROUND AND SUMMARY OF THE INVENTION

This invention relates to a burner and, more particularly, to a burner for gas turbine engines having a ring-shaped swirling device which is coaxially assigned to a fuel nozzle. The swirling device forms tangential ducts between profiled surfaces distributed along the circumference for an adjustable feeding of combustion air.

In the case of modern burners and combustion chamber designs for gas turbine engines, a combustion that is low in pollutants is endeavored, particularly in the primary zone of the combustion chamber. It was found that a significant reduction of the emission of pollutants can be achieved in the case of a comparatively low combustion temperature of <1,900° K. in combination with a comparatively high proportion of air with respect to the fuel fed.

In addition, relatively low pollutant emissions require, among other things, a uniform processing of the fuel-air mixture to be supplied to the primary zone as well as good combustion efficiency. This is particularly true in the case of burners known according to German Patent Document DE-PS 24 42 895 which operate with air support as "low-pressure systems" with a high fuel atomization efficiency and a partial wall-side and aerodynamic fuel evaporation. However, the known case does not provide swirling devices which can be adjusted with respect to the air flow rate in order to control different operating conditions with respect to correspondingly required variable fuel-air flow rates in a manner that is as low in pollutants as possible.

Furthermore, combustion chamber concepts which, in the interest of providing low polluting combustion, provide a "variable chamber geometry" in order to supply combustion air and possibly mixed air by way of holes of the rows of holes are high in construction expenditures, technically complex, susceptible to disturbances and expensive. These devices can be controlled in their cross-sections by pipe sections of the flame tube jacket of the combustion chamber which can be displaced relative to one another in the axial or circumferential direction.

From European Patent Document EP-PS 0251895, an annular combustion chamber for a gas turbine engine is known. In this case, in order to provide a low polluting combustion, an "external" swirling device is assigned to each burner. The swirling device can be regulated with respect to the supply of a portion of the combustion air.

In the known case, a screen which can be rotated on the outside on a central body in the circumferential direction and which has webs on openings distributed along the circumference performs the regulation. The webs, according to their length, only partly project into radial/tangential openings of the central body. The webs project in such a manner that in intermediate positions of the screen, they each have an angular position which deviates from the openings. In the intermediate positions which are decisive for performing the regulating, a guiding of the duct is obtained which throttles the air flow at the inlet, is divergent in the direction of the flow, and expands abruptly downstream of the trailing edge of the web in the direction of a large-surface duct outlet. In the process, the respective circumferential component of the flow at the respective outlet of the opening is clearly weakened via a separating diffuser flow, whereby generation of the required swirl is considerably impaired. This is a significant disadvantage with respect to developing a uniform turbulence, such turbulence being required during the whole operating condition, as well as a resulting uniform and stable low polluting combustion.

There is therefore needed a burner of the initially mentioned type, in the case of which, while the construction is relatively simple, more compact and lighter, at least one swirling device permits the air flow rate required for a combustion which is uniform and low in pollutants while a uniformly pronounced rotation whirl is formed over a large control range.

According to the present invention, these needs are met by a burner for a gas turbine engine having a ring-shaped swirling device which is coaxially assigned to a fuel nozzle and which forms, between profiles arranged along the circumference, tangential flow ducts for an adjustable feeding of combustion air. The ring-shaped swirling device comprises annular disks which are profiled on their faces with engaging claws. The cross-sections of said flow ducts are controlled by respective axial displacement of at least one of the two annular disks with the engaging claws.

The present invention provides variable swirling ducts which are each distributed uniformly along the circumference and can be constructed in a relatively simple manner. The swirling ducts, in a section view transverse to the swirling device, are always designed to be uniform, for example, wedge-shaped. In this case, the respective duct width, in the direction of the burner axis, of all the ducts, is uniformly variable along the entire length of the ducts. This is all the result of the fact that the respective profiles with their linear faces can be axially moved more or less deep into the corresponding recesses. For example, in an end position in which the profiles and the recesses are completely pushed into one another, the swirling device can be completely blocked off on the air supply side. Despite a relatively large adjusting or regulating range, a burner with such a swirling device can be manufactured in a lighter and more compact construction.

In all embodiments of the present invention, also within the scope of further developments, profiled and walled duct structures are provided. The structures are enclosed along the entire duct length. On the structures, significant dynamic disturbance factors which could impair the respective required swirling efficiency and, in turn, the rotational whirl geometry in the primary zone, do not occur either on the inlet side, the flow-through side, or on the outlet side.

Constructions of the adjustable swirling device which are possible as further embodiments of the invention permit relatively large air flow rates, while the manufacturing is economically acceptable and the construction is compact and light. The profiles have additional frontally open duct recesses which, in a completely pushed-in end position of the remaining profiles and recesses with adjacent component faces, make available the smallest cross-sections of the swirling ducts. By performing an axially opposite component adjustment to the last-mentioned end position, advantageously larger, or a largest, duct cross-section may be adjusted. These cross-sections are preferably constructed in the direction from the outer to the inner ring circumference of the swirling device, while they narrow down in the shape of a wedge or a nozzle. This is so that, also in the case of large amounts of air, a good swirling efficiency and thus a good rotational whirl development is achieved.

Using the adjustable swirling device, all or a significant portion of the primary air which is required for a combustion that is low in pollutants can be supplied. The swirling device can be adjusted for the flow rate of relatively small and relatively large amounts of air.

In an advantageous further embodiment, the present invention permits the combination of at least one controllable or adjustable swirling device with a stationary swirling device. This makes available a constant air supply during the whole operating condition. The fuel supply is varied depending on the load condition, in which case an air supply is "superimposed" on the variable operating conditions which, while being adapted to the respective operating conditions, meets the air requirement with respect to a low polluting combustion. The latter air requirement may be regulated, for example, as a function of an operationally increasing combustion temperature and/or pressure in the combustion chamber. The present invention includes the possibility of burning, for example, stoichiometrically, in certain engine conditions, as well as dependent on the design and use spectrum of the engine, i.e., during the ignition and start of the operation, as well as possibly during an extreme full load, and to burn, predominantly in the cruising operation, with a large amount of air and therefore in a manner than is low in pollutants.

The concerned swirling devices may generate rotational or mixed air swirls which rotate with respect to the burner axis or nozzle axis approximately in the same direction or in mutually opposite directions.

Other objects, advantages and novel features of the present invention will become apparent from the following detailed description of the invention when considered in conjunction with the accompanying drawings.

DETAILED DESCRIPTION OF THE DRAWINGS

Figure 1:
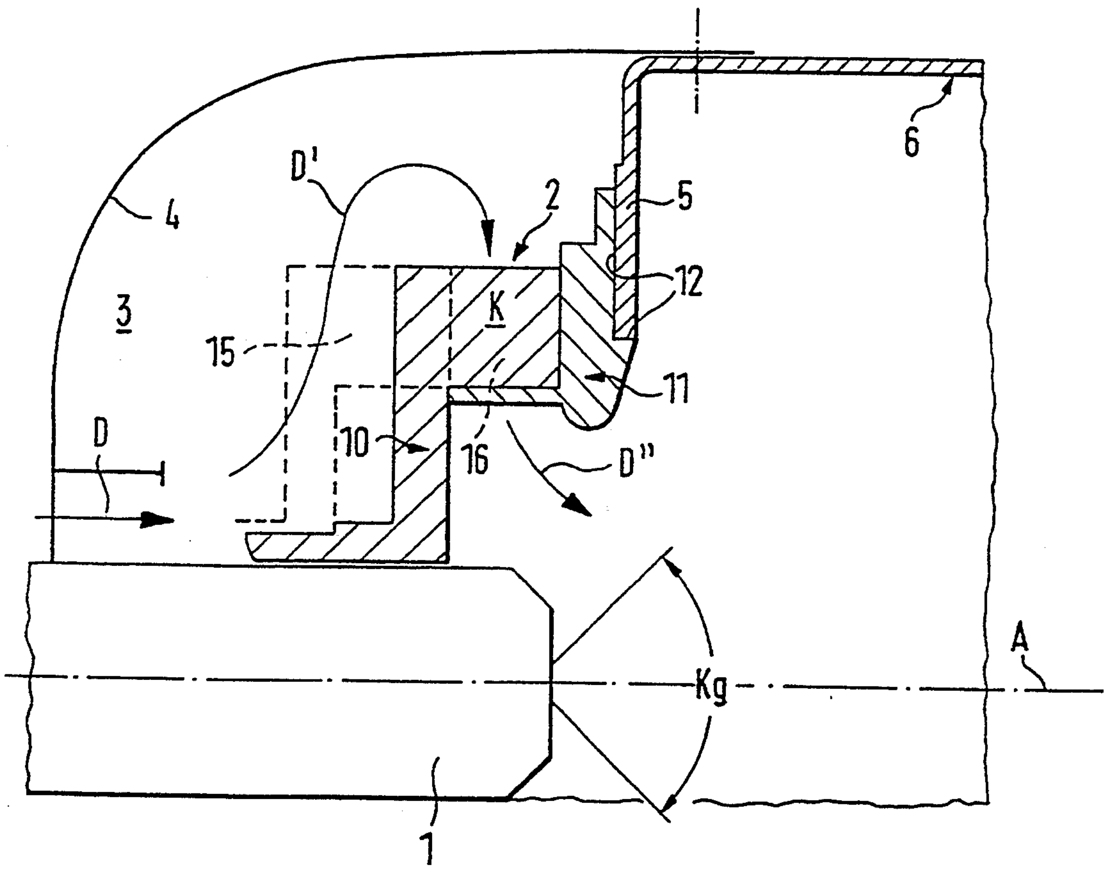
FIG. 1 is a longitudinal sectional center view of the upper half of a combustion chamber head end as well as a view that is broken off on the flame tube side comprising the burner, while an adjustable swirling device which is shown in various end positions is assigned to the fuel nozzle.

According to FIG. 1, a ring-shaped swirling device 2 is coaxially assigned to a fuel nozzle 1 in the case of a burner of a gas turbine engine. In this case, a portion of the air removed at the compressor end first flows according to arrow D as primary air in the axial direction into an upstream annulus 3 constructed at the head end of the combustion chamber. By way of the annulus 3, the primary air D is fed over the component 10 after a local deflection according to the direction of the arrow D' of the swirling device 2 from above and from the outside in the radial direction. The component 10 is frontally closed in itself. The annulus 3 is formed between a closing hood 4 as well as, viewed from the left to the right, a section of the fuel nozzle 1, the swirling device 2 and the rear wall 5 of the flame tube 6 of the combustion chamber. By means of solid lines, FIG. 1 shows the completely closed end position of the swirling device 2 with the ducts K. The interrupted contour (component 10) shows the completely open end position of the swirling device 2 with the ducts K.

In the present embodiment, one annular-disk-shaped component 10 is arranged so that, via its radially interior sleeve-shaped shaft end, it can be axially displaced or adjusted on the fuel nozzle 1. In a construction and arrangement that is coaxial to the common nozzle and burner axis A, the other annular-disk-shaped component 11 is fixedly anchored by way of a recess 12 on the rear wall 5.

Figure 2:
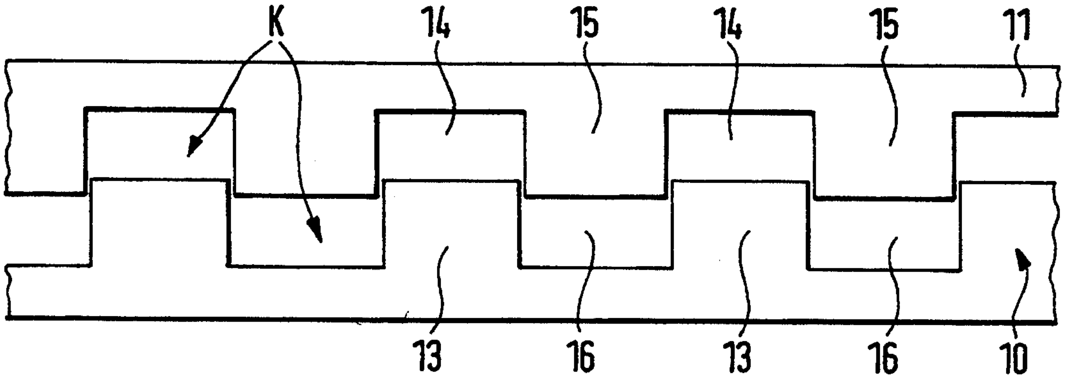
FIG. 2 is a sectional representation of the swirling device according to FIG. 1 in a developed circumferential top view projected into the plane of the drawing, in which case the swirling ducts are in each case essentially adjusted to the largest flow cross-section.

As illustrated particularly in FIG. 2, at the mutually opposite faces, ducts K which are offset relative to one another along the circumference are developed between mutually opposite profiles and recesses 13, 14 and 15, 16 of both components 10, 11. Variable cross-sections of the ducts K may therefore be made available by way of an axial adjustment of, for example, one component 10 by a correspondingly variable inserting depth of the profiles 13 and 15 into the respective recesses 14 and 16.

The profiles 13, 15 and the ducts K formed by the recesses 14, 16 may each, viewed from the exterior to the interior ring circumference, be constructed so as to taper in a wedge-shaped manner which is not illustrated.

Figure 3:
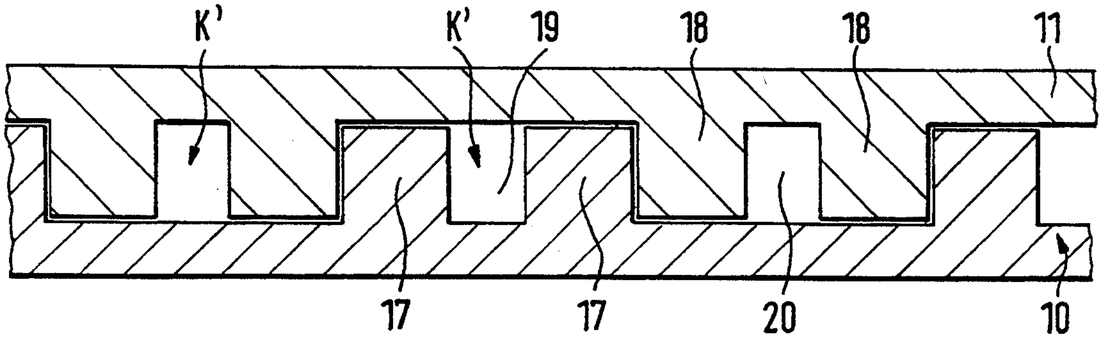
FIG. 3 is a sectional developed circumferential view projected into the plane of the drawing of another embodiment of the swirling device, in which the profiles of both components have additional duct recesses which, in the end position in which they are completely pushed into one another, make available the respective smallest duct cross-sections.
Figure 4:
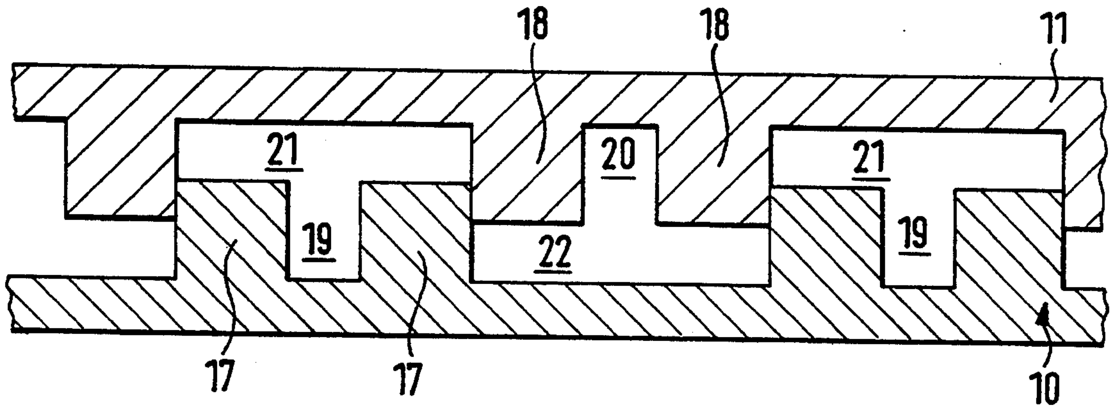
FIG. 4 is a view according to FIG. 3 of the swirling device, but in this case in an intermediate position with relatively large duct cross-sections.
Figure 5:
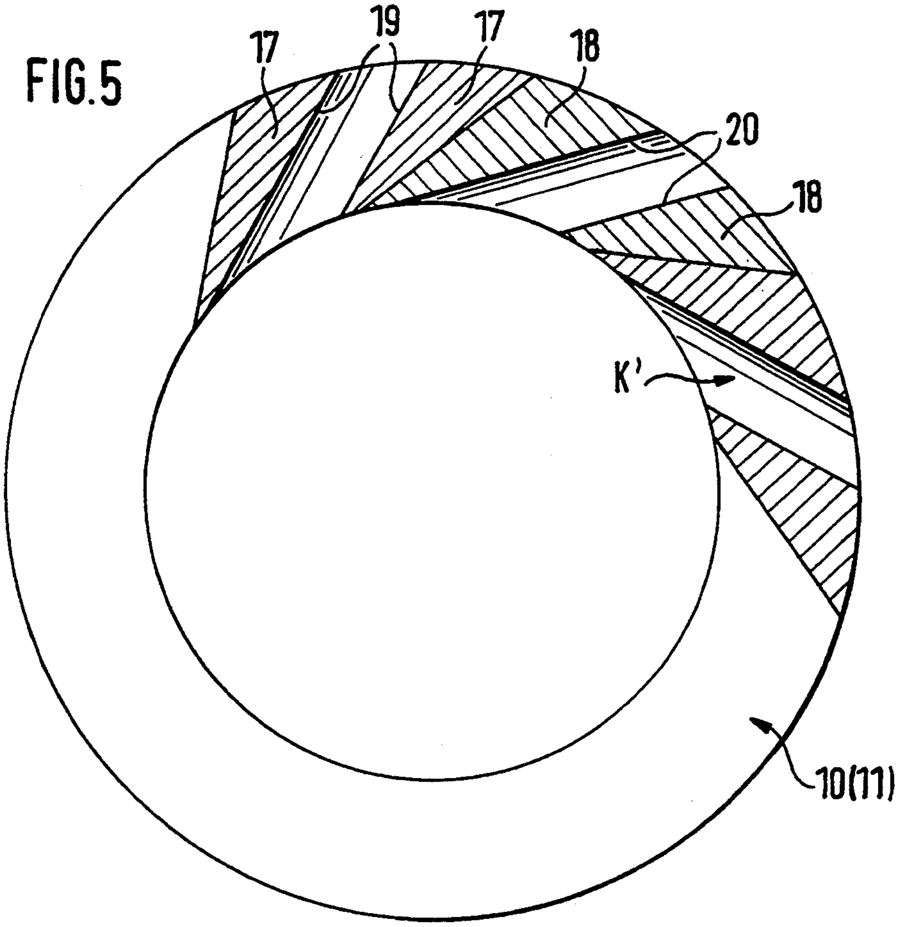
FIG. 5 is a front view of a the swirling device according to FIGS. 3 and 4 and is partially cut-open transversely to the burner axis.

Deviating from the embodiment according to FIGS. 1 and 2, the profiles 17, 18 of the two components 10, 11, according to FIGS. 3 to 5, may also each have an additional, frontally open recess 19, 20. By means of these additional recesses, the profiles 17, 18 engage in an axially displaceable manner in a recess 21 and 22. These recesses are in each case opposite on the face side so that, in an intermediate position according to FIG. 4 or, for example, in a completely opened end position, relatively large, approximately T-shaped duct cross-sections are formed. In the completely axially pushed-in end position according to FIG. 3, the recesses 19, 29 in this case form, for example, rectangular ducts having a smallest cross-section, in which case here, for example, linear tangential ducts K′ with a rectangular cross-section exist in a continuous manner.

Figure 6:
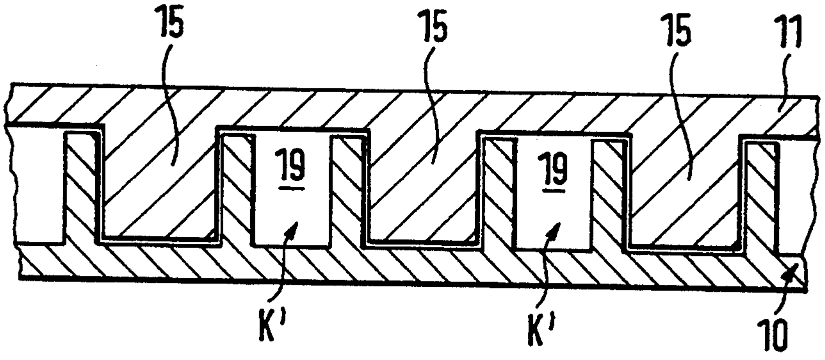
FIG. 6 is a view of another embodiment of the swirling device illustrated in FIGS. 3 or 4, in this case in a completely mutually pushed-in end position while the respective smallest duct cross-sections are formed by duct recesses which are arranged on only one frontal component side between relatively narrow profiles.
Figure 7:
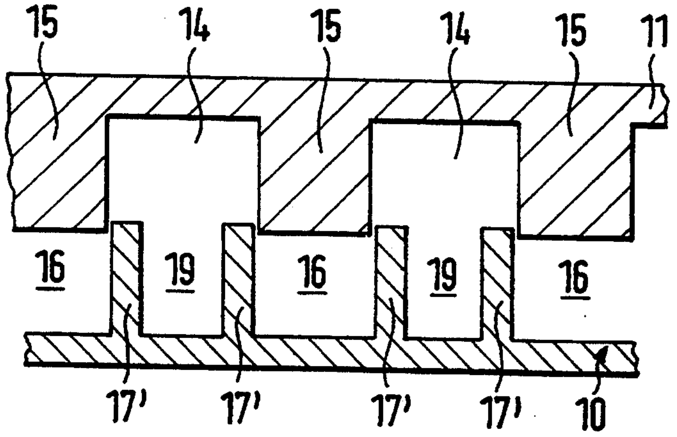
FIG. 7 is a view of the embodiment of the swirling device according to FIG. 6 in the second end position, while the largest overall flow cross-section is formed, with a different duct development which is continuously mutually offset in the circumferential direction between the two components.

In combination with the fundamental construction according to FIG. 2, and partially according to FIGS. 4 and 5, in the case of the embodiment of the swirling device according to FIGS. 6 and 7, only the profiles 17′ which axially project from a component 10 on the face-side have frontally open additional recesses 19. The profiles 17′ can be moved axially more or less deep into the opposite recesses 14 of the other component 11. In the end position, according to FIG. 7, for the maximal overall flow cross-section or in intermediate positions, swirling ducts exist which are, on the one hand, formed by the duct recesses 14, 19 and, on the other hand, by the recesses 16. In the end position according to FIG. 6, the swirling ducts, which were formerly made by the recesses 16 (FIG. 7), are completely closed. In this case, the smallest overall flow cross-section is formed by additional duct recesses 19.

Figure 8:
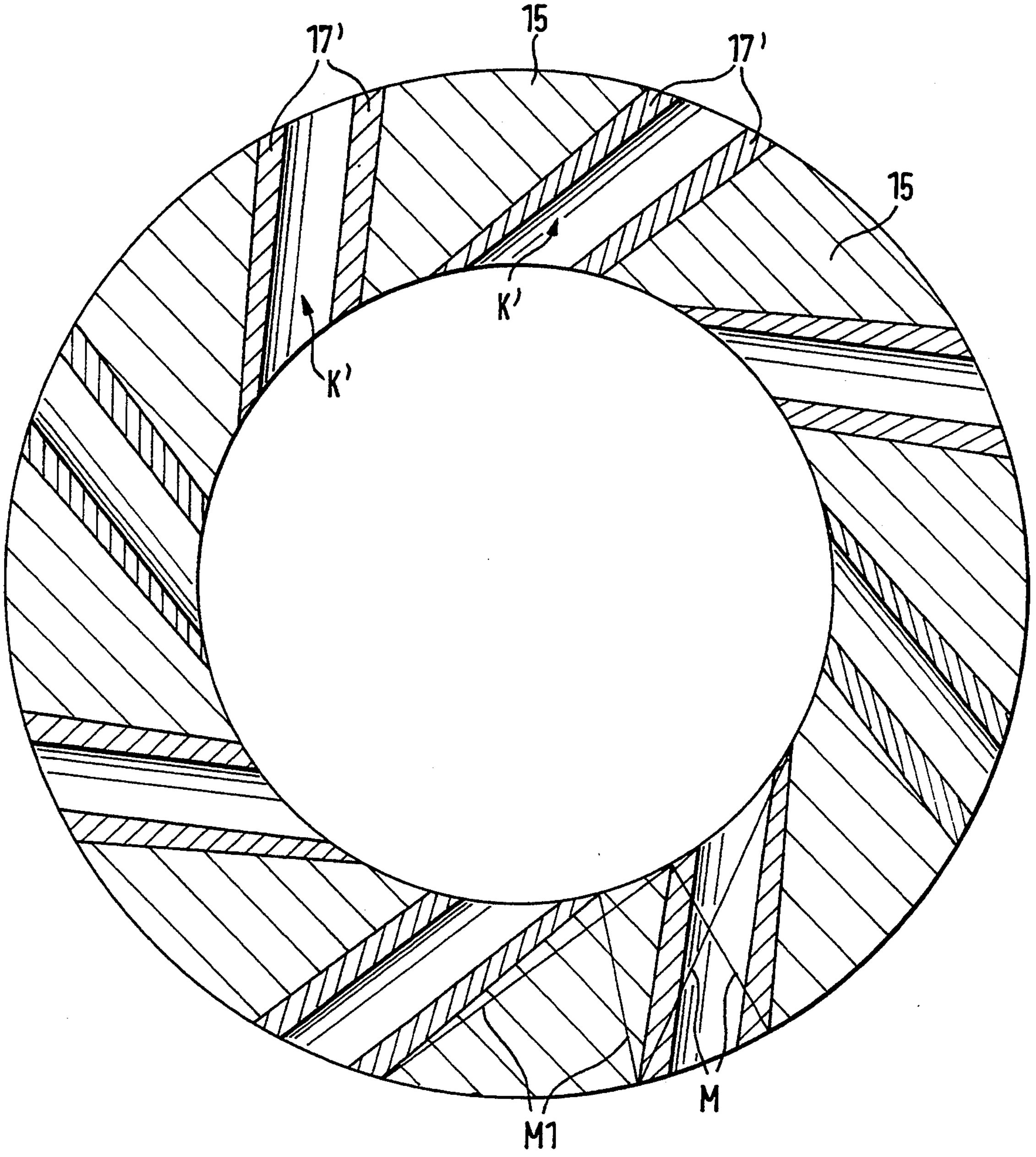
FIG. 8 is a cross-sectional view of the swirling device according to FIGS. 6 and 7 and according to the first end position shown in FIG. 6.

The sectional representation according to FIG. 8 illustrates that the profiles 17′, which are constructed with a relatively thin wall, are constructed to have parallel walls and a continuously uniform wall thickness on one side of the duct. They are also constructed to be slightly tapering in a wedge shape from the exterior to the interior ring circumference on the opposite side of the duct. The recesses 19 therefore form continuously rectangular swirling ducts K′, with walls which extend in parallel to their straight center axes, specifically also in the circumferential direction. FIG. 8 also illustrates that all profiles 15 of one component are constructed to be uniformly tapering in a wedge shape in the direction from the exterior to the interior ring circumference. For example, in the fully opened end position according to FIG. 7, opened duct recesses 14, 16 exist, of which some recesses 14 are constructed to be continuously rectangular according to the crosswise marking M (FIG. 8). The other recesses 16 are constructed according to the crosswise marking M1 (FIG. 8) in the sense of the profiles 15, tapering in a wedge shape from the exterior to the interior ring circumference.

Figure 10:
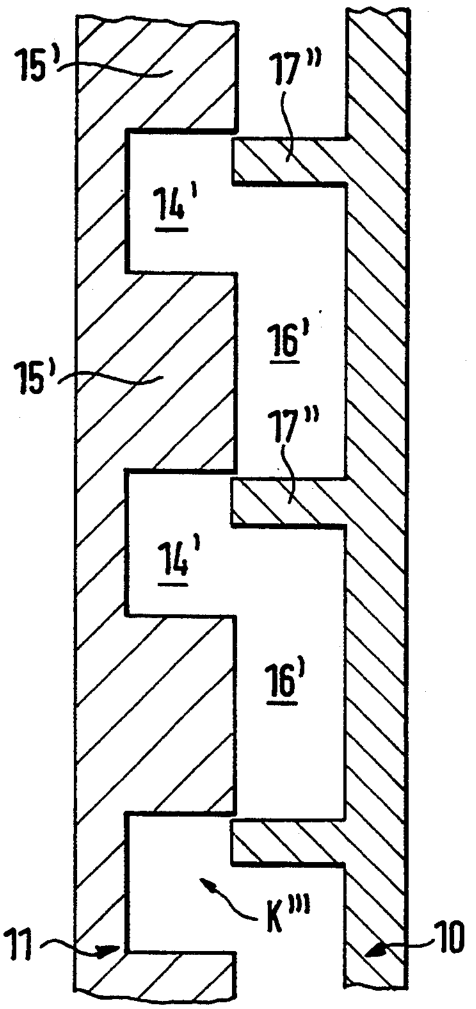
FIG. 10 is a view of the swirling device of FIG. 9 in a second end position while respective angular duct structures are formed for the respective largest duct cross-section.
Figure 9:
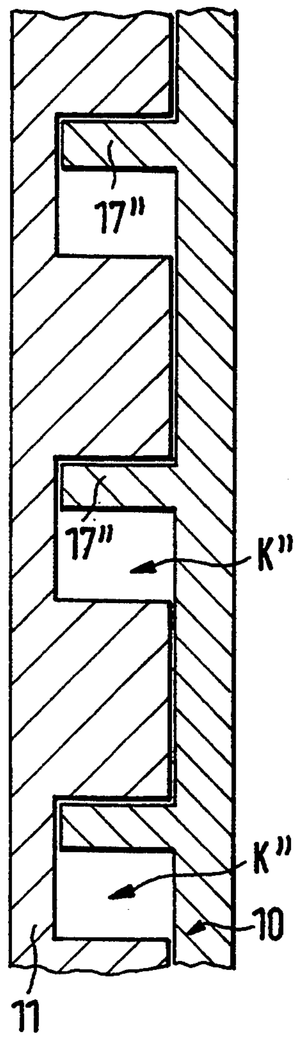
FIG. 9 is a view of another embodiment of the swirling device illustrated, for example, according to FIG. 6 in the first end position with the respective smallest duct cross-sections, the profiles of one component being relatively slim and being arranged at a relatively large circumferential distance and being slidable on one side axially along profiles of the other component.
Figure 11:
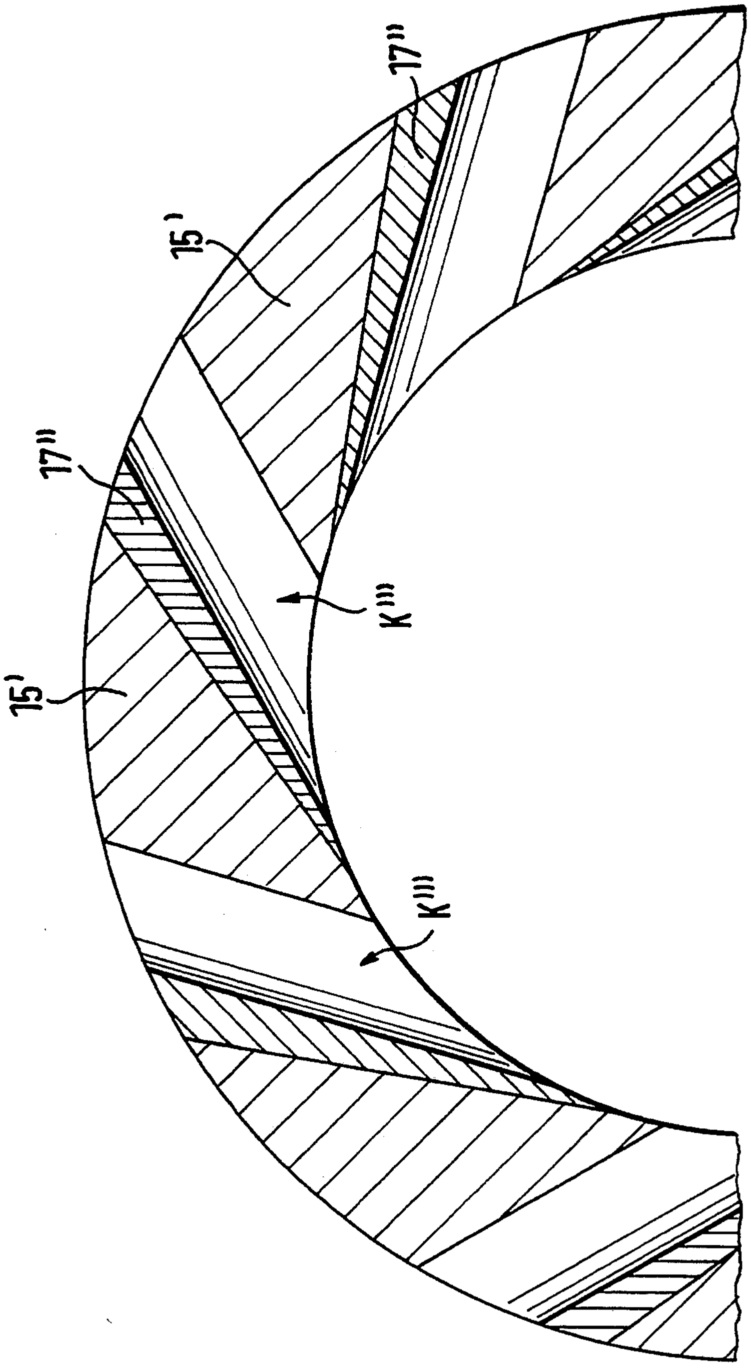
FIG. 11 is a semicross-sectional view of the swirling device according to FIGS. 9 and 10 and according to the first end position shown in FIG. 9.

The embodiment according to FIGS. 9 and 10 is mainly characterized in that the profiles 17″, of one axially slidable component 10, which are each designed to be relatively slim or thin-walled, are arranged so as to be spaced at larger distances in the circumferential direction and thus circumferential widths of the pertaining recesses 16′ are larger than the profiles 15′ of the other component 11. Also in this case, the profiles 15′ and 17″ are each arranged to be axially displaceable on one another on only one side, such that an additional securing against circumferential twisting of one component 10 would have to be provided, for example, axially in the manner of a groove and spring. By means of the axial moving or sliding of the profiles 17″ into the relatively small recesses 14′, or of the relatively thick profiles 15′into the relatively large recesses 16′ (FIG. 10), in the completely pushed-in end position (FIG. 9), linear swirling ducts K″ are created having a continuously identical rectangular cross-section. All profiles 15′, 17″ are constructed to be increasingly tapered in the shape of a wedge in the direction from the exterior to the interior ring circumference. The duct cross-sections of 14′, 16′, which are the largest in FIG. 10, could be roughly described as being bent in an L-shape relative to the burner axis A (swirling ducts K‴).

Figure 12:
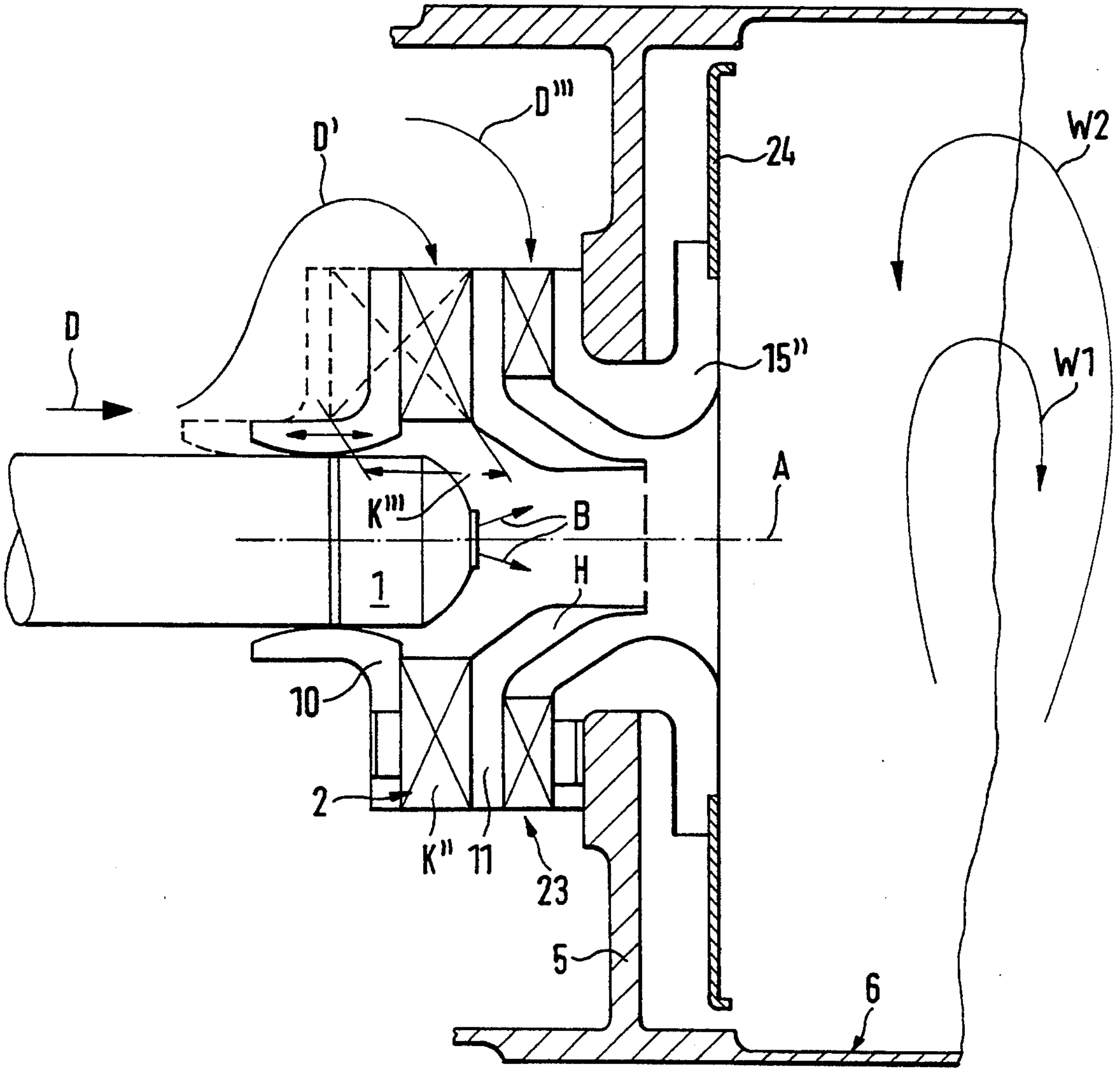
FIG. 12 is a longitudinal center sectional view of the head end of a combustion chamber illustrated on the flame tube side in a locally broken-off manner, with a burner which, assigned to the fuel nozzle, consists of the combination of an adjustable and a stationary swirling device.

In reference to FIGS. 1 and 12, it should be noted that the respective fuel nozzle 1 may be additionally displaced axially in order to always optimally coordinate the spray cone Kg of the nozzle 1 (FIG. 1) with the respective flow-off direction D″ of the primary air with one another in such a manner that in all load conditions a fuel enrichment of the rotational swirl or swirls (air) is achieved in the primary zone. The enrichment is uniform in view of the air volumes to be0 controlled.

However, within the scope of the invention, the swirl ducts and/or the profiles may also be constructed so as to be curved or, in the manner of blade ducts and/or in a blade shape.

FIG. 12 illustrates another embodiment of the present invention with a burner constructed on the head end of the combustion chamber in combination with a swirling device 2. The swirling device 2 can be adjusted in the sense of FIGS. 1 to 11, with a stationary swirling device 23 arranged behind it and which, also, a radial inflow (arrow D‴) is supplied from the primary air D flowing in the axial direction.

In contours illustrated by the solid lines, the adjustable swirling device 2 represents an end position with the respective smallest overall flow cross-section according to ducts K″, for example, according to FIG. 9. This is in contrast to the largest overall flow cross-section shown by an interrupted line and with the ducts K‴, which in this case are maximally opened in the sense of FIG. 10.

According to FIG. 12, the adjustable swirling device 2 has an annular disk-type component 10 with a sleeve-shaped inner shaft. The component 10 is arranged to be axially displaceable or adjustable on the fuel nozzle 1. The other or stationary component 11 forms a shielding wall in FIG. 12 which separates the swirling ducts of the swirling devices from one another, and which ends in a sleeve H that is coaxial to the nozzle axis or burner axis A at a downstream end. By way of respective fixed profiles which form the swirling ducts of the stationary swirling device 23, the fixed component 11 of the adjustable swirling device 2 is centrally and firmly held via a deflecting piece 15″ on the flame tube rear wall 5 or on the combustion chamber housing. The deflecting piece 15″ has a convergent/divergent radially interior wall contour which is also rotationally symmetrical to the nozzle axis or burner axis A. Radially on the outside, the deflecting piece 15 is continued by means of a shielding wall 24 at a axial distance with respect to the rear wall 5.

By way of the two swirling devices 2, 23 (FIG. 12), rotational swirls W1, W2 may be generated in the primary zone. The swirls W1, W2 are rotated in the same rotational direction or in opposite directions to one another, and are enriched or mixed intimately with fuel B from nozzle 1.

In the end position of the swirling device 2, in combination with the stationary swirling device 23, a combustion in the primary zone can be achieved which is extremely rich in air or "cold" and low in pollutants.

The axial adjustment of one of the two components, for example component 10, of the adjustable swirling device 2 may take place via hydraulically, pneumatically or electrically actuated adjusting devices. Particularly in the case of an annular combustion chamber with burners which are arranged at the head end to be distributed uniformly along the circumference, there is the possibility for such an operation that a rotatory adjusting movement of a common ring by way of levers as well as oblong-hole slot guides—the latter in each case arranged obliquely to the burner axis—is in each case converted into an axial adjusting movement of at least one component 10 or 11 ("ring disk").

In the case of a corresponding axial adjustment of the at least one component, such as component 10, the corresponding swirling device 2 can adjust or control the air flow rate as a function of the engine load condition, from individual engine parameters or variables, or as a function of locally measured pressure and temperature courses in the combustion chamber.

All profiles herein described may be defined as "claws" or of a "claw type" as would be understood by one skilled in the art.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A burner for gas turbine engines having a fuel nozzle comprising:

a ring-shaped swirling device coaxially arranged with respect to said fuel nozzle and forming flow ducts tangential to an inner circular passage of said ring-shaped swirling device along a circumference of the device between profiled surfaces for an adjustable feeding of combustion air;

wherein said ring-shaped swirling device comprises two annular disks each with profiled surfaces forming said flow ducts by engaging claws, the cross-sections of said flow ducts being controlled by respective axial displacement of at least one of said two annular disks with said engaging claws.

2. A burner according to claim 1, wherein said profiled surfaces of the two annular disks each have an additional frontally open duct recess, said additional duct recess engaging in an axially displaceable manner in an opposite facing recess, and wherein a smallest duct cross-section is formed in a completely mutually pushed in end position of said annular disks.

3. A burner according to claim 1, wherein the profiled surfaces have cross-sections which taper in a wedge-shaped manner in the direction from a radially exterior ring contour to a radially interior ring contour.

4. A burner according to claim 1, wherein the burner together with the swirling device is arranged on a head end of a combustion chamber, one annular disk being arranged in a stationary manner on the combustion chamber, and the other annular disk being arranged in an axially adjustable manner on one of the fuel nozzle and a nozzle carrier.

5. A burner according to claim 1, wherein the fuel nozzle is arranged to be axially adjustable.

6. A burner according to claim 1, wherein the adjusting of the swirling device takes place via an axial displacement adjustment as a function of the engine load condition.

7. A burner according to claim 6, wherein the adjusting of the swirling device takes place by an axial displacement adjustment as a function of at least one of the measured local pressure and temperature in a combustion chamber.

8. A burner according to claim 1, wherein at least one stationary swirling device is assigned to the swirling device which can be adjusted with respect to a primary air flow rate, said stationary swirling device generating a rotational swirl in a primary zone which rotates in the same rotating direction or in mutually opposite rotating direction to a rotational swirl generated by an adjustable swirling device.

9. A burner according to claim 8, wherein all profiled surfaces of the adjustable swirling device are constructed in the shape of blades and are adapted to one another via recesses in an axially displaceable manner.

10. A burner according to claim 9, wherein the adjusting of the swirling device takes place via an axial displacement adjustment as a function of the engine load condition.

11. A burner according to claim 10, wherein the adjusting of the swirling device takes place by an axial displacement adjustment as a function of at least one of the measured local pressure and temperature in a combustion chamber.

12. A burner according to claim 1, wherein on each second duct successive in the circumferential direction, two profiled surfaces are provided on a face side extending axially from one of said annular disks which enclose another frontally open duct recess such that the profiled surfaces engage in an axially displaceable manner in a recess of the other of said annular disks situated opposite on the face side, and wherein a respective smallest duct cross-section is formed in the completely pushed-together end position of the profiled surfaces and the recesses.

13. A burner according to claim 12, wherein the profiled surfaces provided axially on the face side of the one annular disk are constructed to be slimmer than the profiled surfaces on the other annular disk.

14. A burner according to claim 13, wherein the slimmer profiled surfaces are constructed in one of a wedge shape and with parallel walls so that, relative to a burner axis, continuous parallel-walled swirling ducts are formed between the profiled surfaces.

15. A burner according to claim 14, wherein the burner together with the swirling device is arranged on a head end of a combustion chamber, one annular disk being arranged in a stationary manner on the combustion chamber, and the other annular disk being arranged in an axially adjustable manner on one of the fuel nozzle and a nozzle carrier.

16. A burner according to claim 15 , wherein the fuel nozzle is arranged to be axially adjustable.

17. A burner according to claim 13, wherein the slimmer profiled surfaces of the one annular disk are arranged such that they form larger circumferential recess widths than the profiled surfaces of the other annular disk, the profiled surfaces of both annular disks being axially slidable into one another on only one side.

18. A burner according to claim 17, wherein the profiled surfaces have cross-sections which taper in a wedge-shaped manner in the direction from a radially exterior ring contour to a radially interior ring contour.

19. A burner according to claim 18, wherein the burner together with the swirling device is arranged on a head end of a combustion chamber, one annular disk being arranged in a stationary manner on the combustion chamber, and the other annular disk being arranged in an axially adjustable manner on one of the fuel nozzle and a nozzle carrier.

20. A burner according to claim 19, wherein the fuel nozzle is arranged to be axially adjustable.

* * * * *